(12) United States Patent
Carlson et al.

(10) Patent No.: US 10,960,741 B2
(45) Date of Patent: Mar. 30, 2021

(54) ROTATING LOCK HAVING NOTCH FOR SUNROOF CHECK SYSTEMS

(71) Applicant: AISIN TECHNICAL CENTER OF AMERICA, INC., Northville, MI (US)

(72) Inventors: Erik Carlson, Northville, MI (US); Shintaro Katsura, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 16/356,141

(22) Filed: Mar. 18, 2019

(65) Prior Publication Data

US 2020/0298687 A1 Sep. 24, 2020

(51) Int. Cl.
*B60J 7/043* (2006.01)
*B60J 7/053* (2006.01)
*B60J 7/057* (2006.01)

(52) U.S. Cl.
CPC ............ *B60J 7/0435* (2013.01); *B60J 7/043* (2013.01); *B60J 7/053* (2013.01); *B60J 7/0573* (2013.01)

(58) Field of Classification Search
CPC .. B62B 9/12; B62B 7/008; B60J 7/043; B60J 7/0435; B60J 7/05; B60J 7/053

USPC ........ 296/97.21, 24.46, 216.02, 216.05, 223, 296/224; 280/47.38
See application file for complete search history.

(56) References Cited

U.S. PATENT DOCUMENTS

| | | |
|---|---|---|
| 8,882,187 B2 | 11/2014 | Katsura et al. |
| 9,302,571 B2 | 4/2016 | Katsura et al. |
| 9,376,001 B2 | 6/2016 | Katsura |
| 9,579,958 B2 | 2/2017 | Ide |
| 2009/0079234 A1 | 3/2009 | Faerber |

*Primary Examiner* — Dennis H Pedder
(74) *Attorney, Agent, or Firm* — Oblon, McClelland, Maier & Neustadt, L.L.P.

(57) ABSTRACT

An apparatus and method for a sunroof of a vehicle, including a movable panel, a rail, a drive shoe, a pivot link to control tilting of the movable panel as the drive shoe slides in the forward direction, a lift guide facilitating sliding of the movable panel, and a check assembly for engaging and disengaging the lift guide and the drive shoe. The check assembly includes a mechanical lock, a locking pin, a rotatable lock rotatable about the locking pin and configured with a locked position to prevent movement of the lift guide when the check assembly is disengaged, and a lock guide to guide the rotatable lock into the locked or an unlocked position. The rotatable lock includes a notch to catch an end portion of the mechanical lock and prevent the rotatable lock from rotating into the unlocked position when the check assembly is disengaged.

15 Claims, 12 Drawing Sheets

ROTATING LOCK HAVING NOTCH FOR SUNROOF CHECK SYSTEMS

BACKGROUND

Field of the Disclosure

The present disclosure is directed towards a tilt and outer slide apparatus for a vehicle sunroof, and in particular a rotatable lock that is configured to prevent a lift guide and a mechanical lock from sliding when a check system of the sunroof is disengaged.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Automotive vehicles may be provided with a sunroof in the roof of the passenger compartment. A sunroof assembly may include one or more glass panels in a window assembly. An opening mechanism may also be included, in which case at least one of the glass panels is movable. The movable glass panel opens and closes a substantially rectangular opening defined by a periphery of a housing. The housing is mounted to an opening in the vehicle roof. A panoramic sunroof is a sunroof that is large enough to extend over front and rear passengers in a vehicle. Panoramic sunroofs are found in sedans and sport utility vehicles that have a long roofline that can accommodate the large sunroof. A panoramic sunroof may have one large movable glass panel or may have two separate movable glass panels, one glass panel for the front and one glass panel for the rear passengers. Some panoramic sunroofs having a separate front glass panel may slide the front glass panel back over the rear glass panel. Some panoramic sunroofs have a front glass panel that is able to tilt.

In order to move a glass panel, some sunroof systems, referred to as tilt and outer slide sun roofs, tilt a glass panel so that a rear portion of the panel clears the roof line and then slide the tilted panel rearward to open a vehicle sunroof. In order to tilt the glass panel, the sunroof system performs a tilt-up stroke that includes pushing functional components rearward. Such tilt and outer slide sunroof systems have a tilt-up stroke that tilts the glass panel and moves functional components at a relatively fast speed as it is generally considered necessary to quickly open the sunroof. However, such sunroof systems with relatively fast tilt-up strokes have encountered situations where the sunroof motor stalls during sunroof operation when the vehicle with the sunroof is traveling at high speeds, e.g., highway speeds. In other words, such sunroof systems push functional components in a rearward direction during the tilt-up stroke, which may undergo intense forces during sunroof operation at the high speeds. In addition, such fast operating sunroof systems have been found to have a risk of pinching during various phases of operation.

In order to push functional components rearward during tilt-up, functional components may be coupled together using a check or locking system. When the check system is disengaged and functional components are not coupled together, a lock may prevent undesired movement of a lift guide. However, it has been found that this lock may rotate and move to an unlocked position due to, for example, vibrations of the vehicle.

SUMMARY

The present disclosure relates to a tilt and slide apparatus for a sunroof of a vehicle, including a movable panel configured to open and close an opening formed at a roof of the vehicle, a rail provided at each edge portion in the opening in a vehicle width direction and being extended in a forward-rearward direction of the vehicle, a drive shoe configured to slide in the forward and rearward direction of the vehicle, a pivot link pivotally coupled to the drive shoe, the pivot link to control tilting of the movable panel as the drive shoe slides in the forward direction, a lift guide connected to an end of the movable panel for facilitating sliding of the movable panel in a rearward direction; and a check assembly for engaging and disengaging the lift guide and the drive shoe. The check assembly includes a mechanical lock mounted to the lift guide, a locking pin, a rotatable lock mounted to and rotatable about the locking pin, the rotatable lock configured with a locked position to prevent movement of the lift guide when the check assembly is disengaged, and a lock guide having a guide portion to guide the rotatable lock into the locked or an unlocked position. The mechanical lock includes an end portion. The rotatable lock includes a notch to catch the end portion of the mechanical lock and prevent the rotatable lock from rotating into the unlocked position when the check assembly is disengaged.

The present disclosure relates to a method for a tilt and slide apparatus for a sunroof of a vehicle, the tilt and slide apparatus including a movable panel configured to open and close an opening formed at a roof of the vehicle, a rail provided at each edge portion in the opening in a vehicle width direction and being extended in a forward-rearward direction of the vehicle, a drive shoe configured to slide in the forward and rearward direction of the vehicle, a pivot link pivotally coupled to the drive shoe, the pivot link to control tilting of the movable panel, a lift guide connected to an end of the movable panel for facilitating sliding of the movable panel, and a check assembly for engaging and disengaging the lift guide and the drive shoe, wherein the check assembly includes a mechanical lock and a rotatable lock. The method includes, while the check assembly is disengaged, engaging by an end portion of the mechanical lock a notch in the rotatable lock to prevent the rotatable lock from rotating from a locked position into an unlocked position. When the drive shoe moves in the forward direction to the lift guide, pivoting the pivot link to a raised position to tilt the movable panel, the check assembly coupling the drive shoe and the lift guide, and locking the pivot link in the raised position.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Referring now to the drawings, wherein like reference numerals designate identical or corresponding parts throughout several views, the following description relates to a sunroof assembly for an automotive vehicle. As mentioned above, vehicles may be provided with sunroof assemblies having a movable panel that is tilted and slid. Vehicle sunroofs may include a check or lock system to facilitate coupling and sliding of functional components to move a sunroof glass panel in a rearward direction. Disclosed is a check or locking system that includes a rotating lock that is configured to prevent a lift guide and a mechanical lock from sliding when the check system is disengaged and allow the lift guide and the mechanical lock to slide cooperatively with a drive shoe when the check system is engaged. The rotating lock is interposed between the mechanical lock and the lift guide and positioned on a pin extending therethrough. In order to prevent the lock from rotating to an unlocked position due to vibrations of the vehicle, the rotatable lock includes a protrusion that engages a portion of a lock guide to prevent such rotation. In particular, the rotatable lock includes a notch that receives an end of the mechanical lock, which maintains an orientation of the protrusion (i.e., keeps the rotatable lock in a locked position) when the check system in disengaged. When the check system is engaged, the end of the mechanical lock is moved out of the notch and the rotating lock is enabled to rotate to an unlocked position to allow the lift guide and the mechanical lock to move cooperatively with the drive shoe.

A panoramic sunroof apparatus of a vehicle roof 10 will be explained. As mentioned above, a panoramic sunroof is a sunroof that extends over a large portion of a vehicle roof to provide sunroof features for both front and rear passengers. A front/rear direction refers to a forward/rearward direction relative to a traveling direction of the vehicle having the roof 10. A right/left direction or a width direction refers to a direction of the vehicle relative to the front of the vehicle. An upward/downward direction refers to a direction relative to ground below the vehicle. An indication that a component or element is above or below relates to the upward/downward direction.

Figure 1:
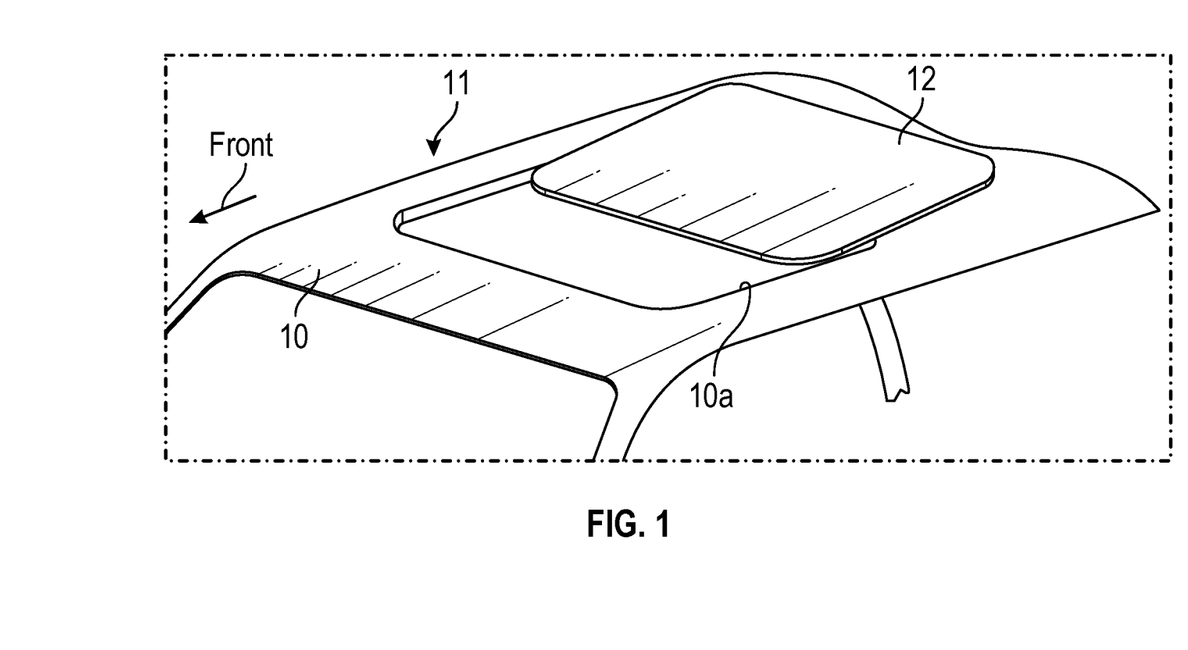
FIG. 1 is a perspective view of a roof in which a sunroof is mounted.

FIG. 1 is a perspective view of a vehicle roof with a sunroof apparatus for a vehicle according to an exemplary aspect of the disclosure. A substantially rectangular opening 10a is formed in a vehicle roof 10 of a vehicle such as an automobile. The opening 10a may have rounded corners. The sunroof apparatus 11 includes a movable panel 12 substantially in a rectangular form. Corners of the movable panel 12 may be rounded to match the shape of the opening 10a. The movable panel 12 may be made of glass, or a safety glass laminate. The movable panel 12 moves in the front/rear direction for opening and closing the opening 10a. Although the drawing shows a single movable panel, the sunroof apparatus may have more than movable panel. A movable panel may be in a forward position toward the front of the vehicle.

However, the movable panel may be in a rearward position, or in a middle position of the sunroof apparatus.

Figure 2:
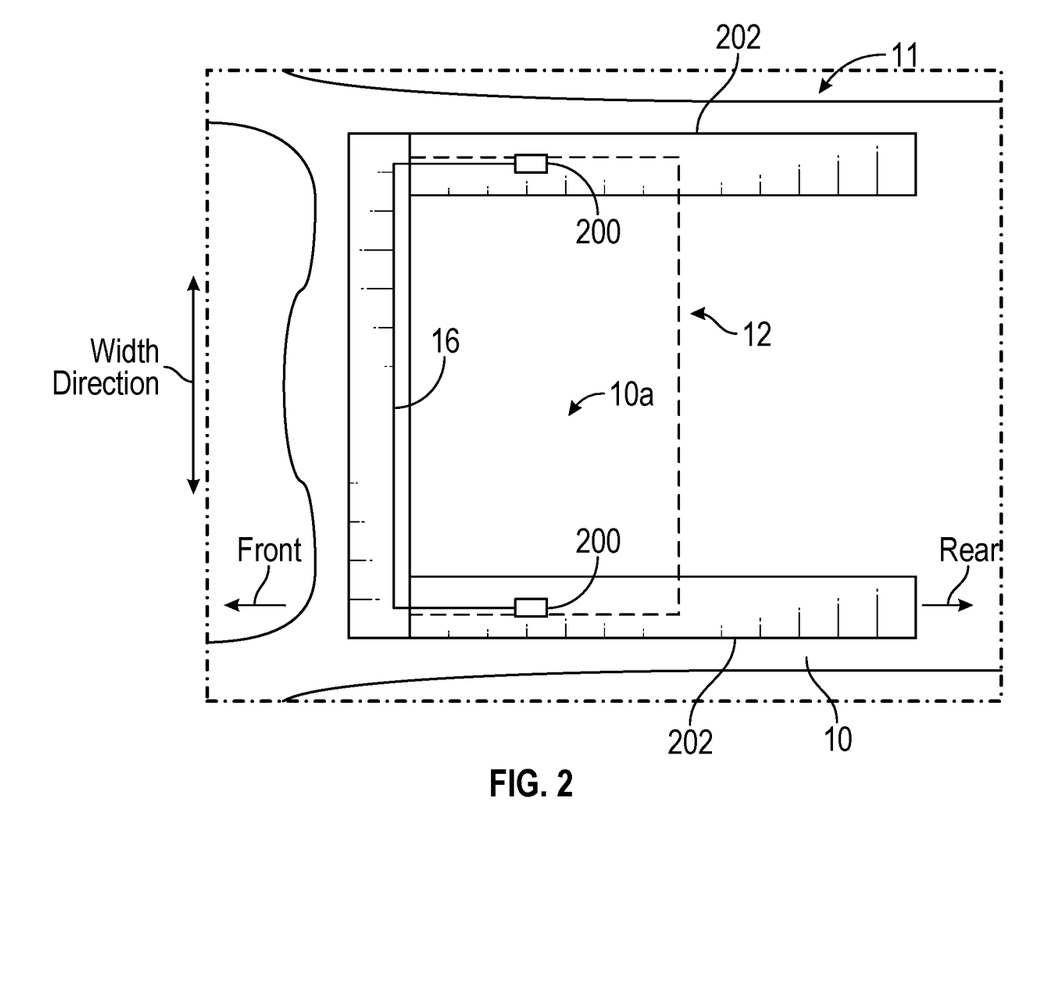
FIG. 2 is a plan view of a sunroof.

Regarding FIG. 2, the sunroof apparatus 11 includes a pair of guide rails 202 provided at opposed edge portions of the opening 10a relative to the vehicle width direction. Each of the guide rails 202 extend in the front/rear direction. The sunroof apparatus operates as a tilt and outer slide apparatus which utilizes various functional components. In particular, the functional components move in the front/rear direction along the guide rails 202 to tilt and slide the movable panel 12. The functional components are supported and guided relative to the guide rails 202. The movable panel 12 is mounted between the functional components so as to be connected to and supported by the functional components.

The guide rails 202 may be made of metallic plate, which to save weight may be a plate made of aluminum alloy.

Respective front edges of the guide rails 202 are connected to each other by a front housing that extends in the vehicle width direction. An electric drive source such as an electric motor serving as a drive source and including an output gear, for example, may be provided at a substantially intermediate portion of the front housing in a longitudinal direction of the housing. The electric drive source is connected to functional components, including a drive shoe 200, via a pair of drive belts 16 made of resin material, for example, and substantially formed in a strap form so as to simultaneously move the functional components provided at the respective guide rails 202 in the front/rear direction.

Figure 3:
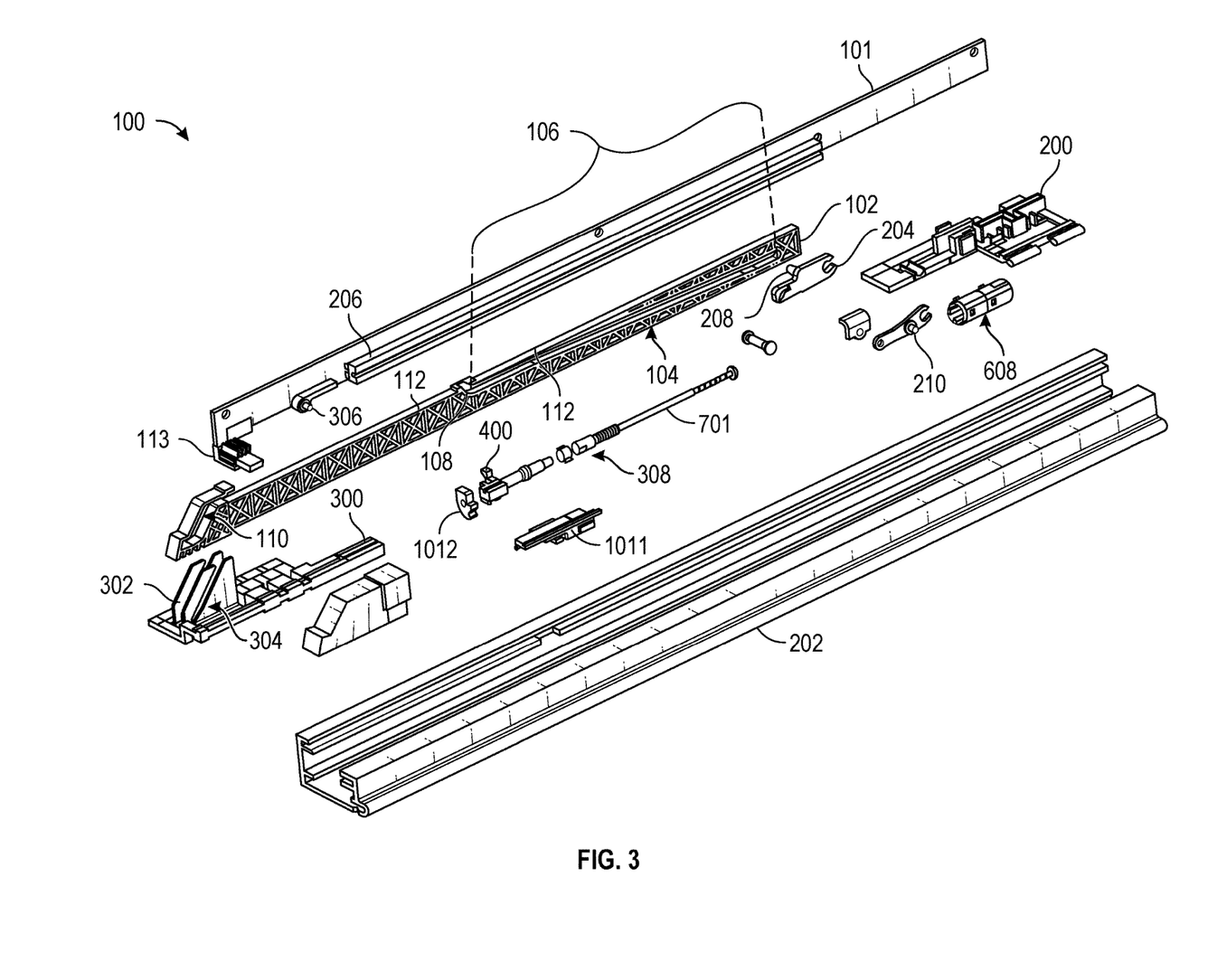
FIG. 3 is a partial view of a tilt and outer slide apparatus in accordance with an exemplary aspect of the disclosure.

FIG. 3 is a break-out view of a tilt and outer slide apparatus 100 for a panoramic sunroof in accordance with an exemplary aspect of the disclosure. FIG. 3 shows functional components of the apparatus 100. A movable receiver bracket 101 is a functional component to which the glass panel is mounted. The glass panel of the sunroof is supported by the moveable receiver bracket 101. Also a functional bracket 206 may be mounted to the receiver bracket 101 along a lower edge of the receiver bracket 101. The functional bracket 206 may be made of metallic plate. The receiver bracket 101 is guided by a first pin 113 mounted to an end of the receiver bracket 101 and a second pin 306 mounted adjacent to an end of the functional bracket 206 at a position between the functional bracket 206 and the first pin 113. The pins 113 and 306 may be made of metal of similar material to the receiver bracket 101. The receiver bracket 101 may be made of metallic plate, of a metal such as aluminum alloy, and be of rectangular shape with a length that is at least as long as the glass panel. The first pin 113 may have a rectangular cross-section. The second pin 306 may have a circular cross-section. Components including the functional bracket 206 and pins 113 and 306 may be mounted to the metal receiver bracket, for example by a weld. The receiver bracket 101 is of minimum height to accommodate the thickness of the glass panel as well as the functional bracket 206.

The apparatus 100 includes a guide block 102. The guide block 102 is a rectangular beam that is of a length that is substantially a majority of the length of the guide rail 202 and includes guide channels formed as grooves in side surfaces of the block 102. The channels are wide enough to receive and guide pins that are part of other functional components. The guide block 102 may be made of a molded plastic.

The guide block 102 defines a first guide channel 104 that extends along a portion of a longitudinal direction of the guide block 102. The first guide channel 104 is at least as long as half of the length of the guide block 102. The first guide channel 104 facilitates tilting of the glass panel as it has an angled portion 106 that is relatively long and a curved portion 108 positioned at an end of the first guide channel and forms a continuous channel with the angled portion 106. (See FIG. 11.) The curved portion 108 is relatively short in length compared to the angled portion 106. The angled portion 106 is relatively straight and slopes downward from a position near a top edge at a center region of the guide block 104 to near a lower edge of the guide block 102 at an end toward a rear direction. The lower edge of the guide block 104 that the angled portion 106 comes near is a rigid support structure that prevents bending of the guide block in the vertical or upward/downward direction.

Further, the guide block 102 defines a second guide channel 110 positioned at or near an end of the guide block 104 in the forward direction and extends to a relatively long guide surface (e.g., a relative flat or even upper surface) 112. The second guide channel 110 receives the first pin 113 attached to and protruding perpendicular from an end of the receive bracket 101. The second guide channel 110 facilitates lifting of an end of the receiver bracket 101 as the receiver channel begins to move in a direction of the rear of the vehicle.

The long guide surface 112 extends away from the second guide channel 110 to an opposite end of the guide block 102. The long guide surface 112 is positioned above the first guide channel 104, and in particular above the angled portion 106 of the first guide channel 104. The long guide surface 112 extends substantially along an upper edge of the guide block 102.

The system 100 also includes a drive shoe 200 that is configured to be pulled (e.g., via a tension of a guide cable 16 affixed to the drive shoe 200) along a guide rail 202 and includes a pivot link 204 pivotably coupled thereto such that the pivot link 204 is able to pivot and/or rotate relative to the drive shoe 200. The drive shoe 200 may be made of a metallic plate with some components made of resin materials. The pivot link 204 may be made of a metallic plate. The pivot link 204 is configured to slidably couple to a functional bracket 206, which is affixed to the receiver bracket 101, to control tilting of the glass panel. The pivot link 204 may be a flat plate with a third pin 208 extending from a face of the plate. In some embodiments, the pivot link includes two separate parts, an inner part and an outer part connected to each other. The pivot link having two parts may pivot at a pair of pins protruding from rear sections of the two parts. The two parts may be spaced apart by a distance of the width of the receiver bracket 101 so that as the pivot link 204 rotates about the connecting pin, the two parts stay on either side of the receiver bracket 101 while the receiver bracket 101 is supported by a connector part that connects between the two parts. The pin 208 or pair of pins may be made of a metal that is the same as the material of the pivot link 204, with the pin 208 welded to a side surface of the metallic plate. In particular, the pivot link 204 may include a third pin 208 protruding from a surface of the pivot link 204 that slides along the first channel 104 of the guide block 102, which causes the pivot link 204 to pivot relative to the drive shoe 200.

The apparatus 100 also includes a lift guide 300 that is configured to move along the rail 202. The lift guide 300 includes a sloped bracket 302 defining an angled or slightly curved guide channel 304 into which a second pin 306 of the receiver bracket 101 extends. The lift guide 300 facilitates maintaining a position of the front of the receiver bracket 101 and/or sliding the receiver bracket 101 after the receiver bracket 101 is tilted.

Further, the apparatus 100 includes a check or locking assembly 308. The check or locking assembly 308 is configured to removably couple the drive shoe 200 and the lift guide 300 together during sunroof operation. The check or locking assembly 308 includes a locking pin 701, a mechanical lock 400, and a receptacle 608. As will be discussed further, the check or locking assembly also includes a rotatable lock 1012 and a lock guide 1011. In addition, the check or locking assembly 308 includes a guide ramp on the drive shoe 200. The guide ramp is configured to facilitate proper locking operation of the check assembly 308 as the glass panel of the sunroof is tilting and/or sliding.

Figure 4:
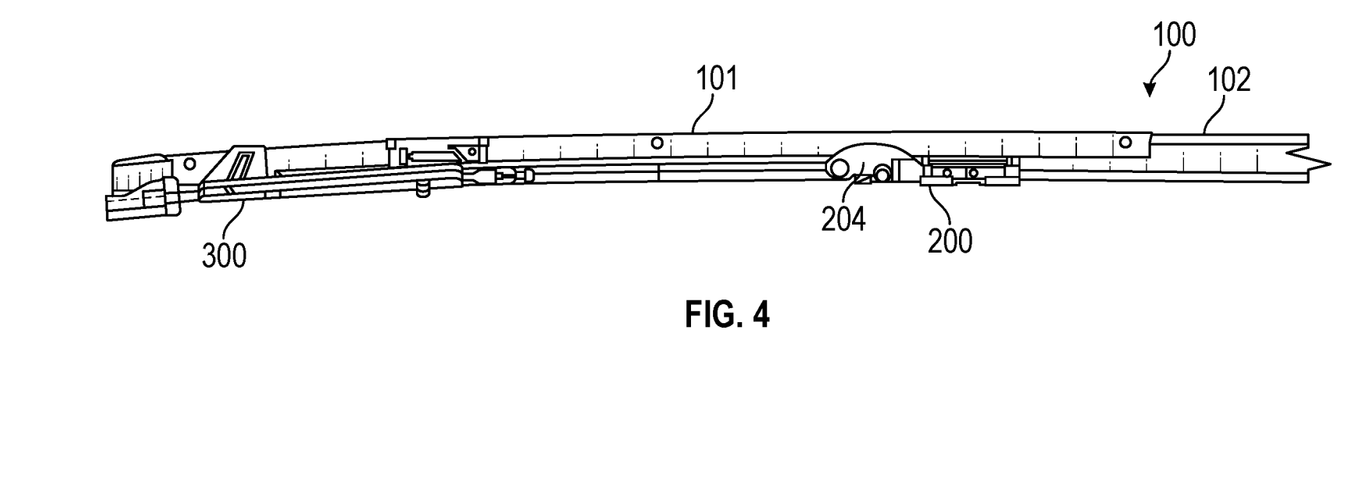
FIG. 4 is a side view of the tilt and outer slide apparatus in a closed position.

A description of the operation of the tilt and outer slide apparatus is provided next. FIG. 4 is a side view of the tilt and outer slide apparatus in a closed position. Initially, the sunroof may be assumed to be in the closed position in which the movable panel 12 is positioned within the opening 10a. The drive shoe 200 is at rest at its farthest position from the forward end of the rail 202. The pivot link 204 is at rest in a position that is the same level as the drive shoe 200. The movable receiver bracket 101 holds the movable panel 12 in a position that covers the entire opening 10a. The lift guide 300 is located in a forward position of the rail 202.

Figure 5:
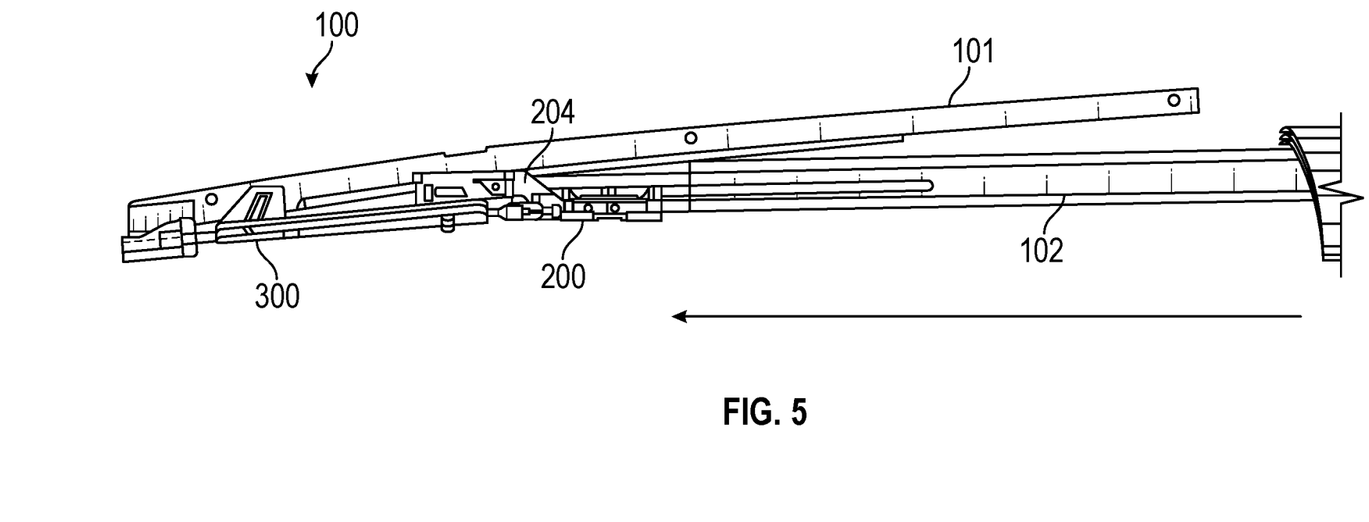
FIG. 5 is a side view of the tilt and outer slide apparatus partially tilt as it moves in a direction toward the front of the vehicle.

FIG. 5 is a side view of the tilt and outer slide apparatus partially tilt as it moves in a direction toward the front of the vehicle. To begin tilting the receiver bracket 101 (and subsequently, the movable panel 12), the drive shoe 200 moves along the rail 202 in a forward direction toward the lift guide 300 (i.e., toward a front of a vehicle). As shown in the figure, as the drive shoe 200 moves in the forward direction, the pin 208 of the pivot link 204 slides along the angled portion 106 of the first guide channel 104 to slowly tilt the receiver bracket 101 and movable panel to a first slightly tilted position.

As the drive shoe 200 continues to move in the forward direction, the pin 208 of the pivot link 204 slides along the first guide channel 104 out of an end of the curved portion 108 and, as a result, the pivot link 204 pivots relative to the drive shoe 200 to further tilt or pivot the receiver bracket 101 relative to the first pin 113 to a second partially tilted position at an tilt angle that is greater than the first tilted position. In particular, the pivot link 204 lifts a central portion of the receiver bracket 101 via the functional bracket 206.

Figure 6:
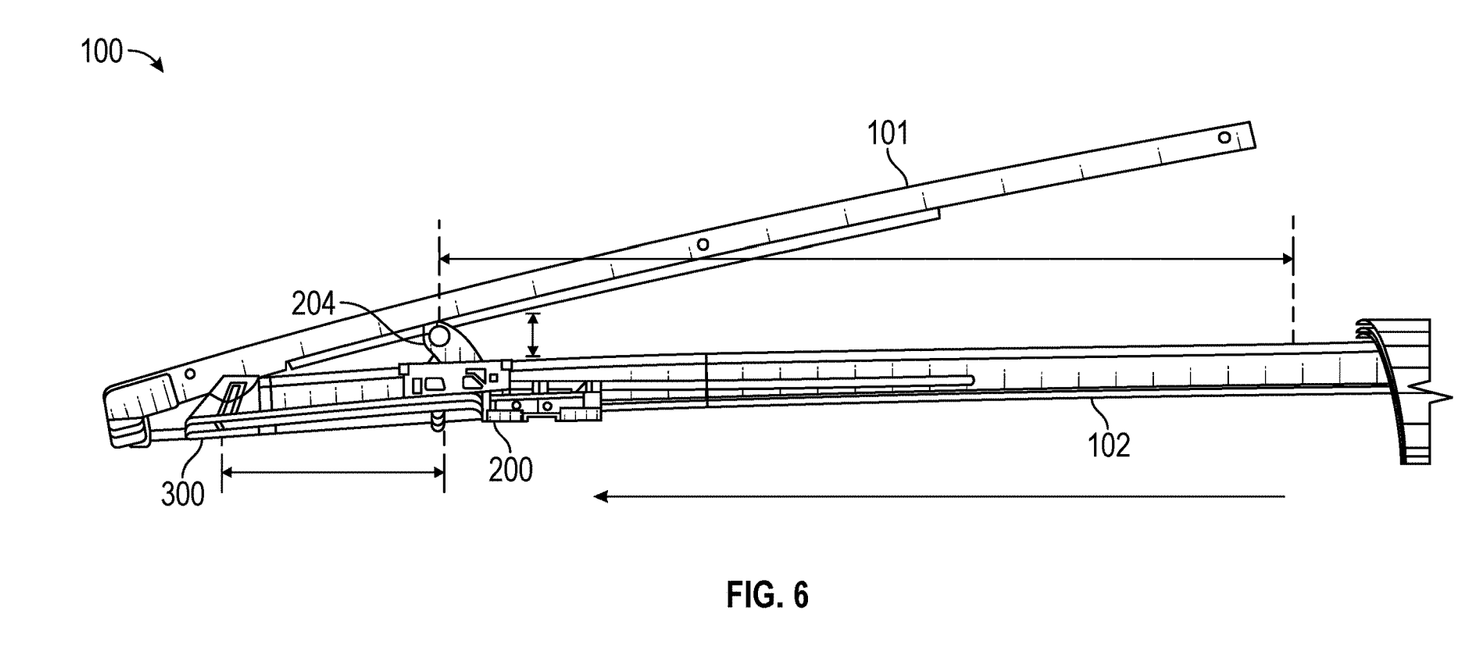
FIG. 6 is a side view of the tilt and outer slide apparatus with a drive shoe coupled to a lift guide in a fully tilted position.

FIG. 6 is a side view of the tilt and outer slide apparatus with a drive shoe coupled to a lift guide in a fully tilted position. The drive shoe 200 continues to move in the forward direction to approach the lift guide 300. When the drive shoe 200 first comes into contact with the lift guide 300, the drive shoe 200 begins to couple to the lift guide 300 via the check or locking assembly 308. Proper locking operation of the check or locking assembly 308 requires rotation of a locking component having a locking feature and requires that the locking feature align with an opening of the receptacle while the drive shoe 200 approaches the lift guide.

Figure 7:
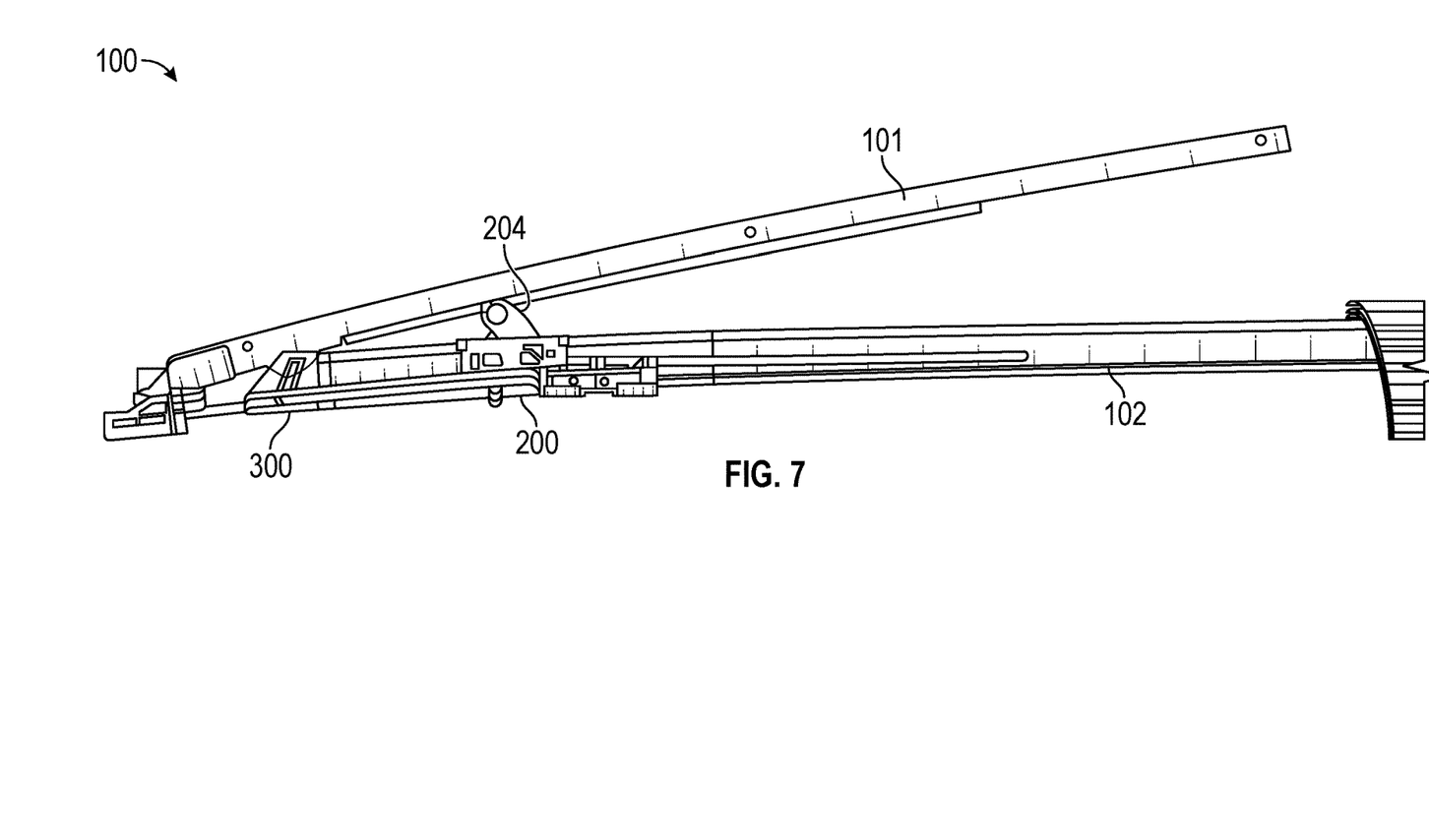
FIG. 7 is a side view of the tilt and outer slide apparatus as the drive shoe and lift guide begin to pull the receiver bracket backward.

FIG. 7 is a side view of the tilt and outer slide apparatus as the drive shoe and lift guide begin to pull the receiver bracket rearward. Regarding FIG. 7, both the drive shoe 200 and the lift guide 300 are pulled cooperatively along the guide block 102 in a rearward direction (i.e., toward a back of the vehicle) to further lift and slide the receiver bracket 101 in the fully pivoted position of the pivot link 204. The pivot link 204 remains in the fully pivoted position to maintain the receiver bracket 101 in the lifted position.

In particular, when the drive shoe 200 and the lift guide 300 begin to move in the rearward direction, the first pin 113 of the receiver bracket 101 moves along the second guide channel 110 to reach the long guide surface 112 of the guide block 102. The movement of the first pin 113 along the second guide channel 110 lifts the end of the receiver bracket 101. Then, as the drive shoe 200 and lift guide 300 continue moving in the rearward direction, the first and third pins 113, 208 slide along the long guide surface 112 and above the first guide channel 104 which provides support for the receiver bracket 101 (i.e., neither of the pins 113, 208 fall into the curved portion 108). An inner surface defined by the guide channel 304 of the lift guide bracket 302 imparts a force on the second pin 306, thereby causing the receiver bracket 101 to slide. The gradual lifting of the receiver bracket 101 as the pivot link 204 slides along the angled portion 106 in the forward direction then lifting the end of the receiver bracket 101 when the first pin 113 travels along the second guide channel enables a slow tilt rate of the receiver bracket 101.

Figure 8:
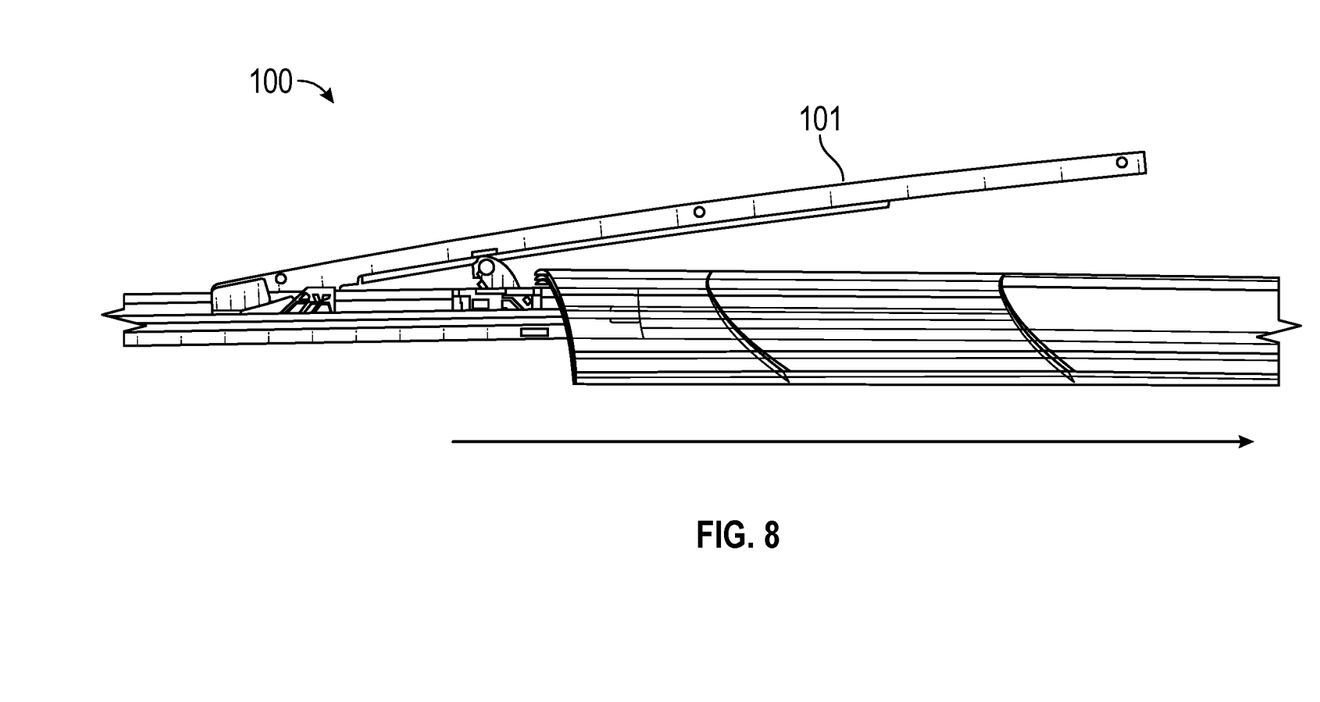
FIG. 8 is a side view of the tilt and outer slide apparatus with the receiver bracket in the open position.

FIG. 8 is a side view of the tilt and outer slide apparatus with the receiver bracket in the open position. The tilt and outer slide apparatus moves with the receiver bracket 101 and glass panel 12 in a tilted position such that the drive shoe 200 slides below the vehicle roof 10.

As a result, the system 100 provides a relatively long tilt-up stroke (i.e., a slow tilting rate) and slide stroke of the receiver bracket 101 via the guide block 102, the drive shoe 200, and the lift guide 300, which improves sunroof performance during high vehicle speeds as well as improves customer satisfaction. Additionally, aspects of the system 100 are adjustable to accommodate different requirements. Parameters, such as a length, an angle, a degree of curvature, of the angled portion 106 and/or the curved portion 108 of the first guide channel 104 can be changed to provide a different (e.g., longer or shorter) tilt-up stroke.

Movement of the receiver bracket 101 in the rearward direction through movement of the drive shoe 200 and lift guide 300 requires that the check or locking assembly 308 be properly locked and remain locked. Also, the check or locking assembly 308 must be able to decouple so that the drive shoe 200 can move rearward from the lift guide 300 to bring the movable panel 12 back to a closed position.

Figure 9:
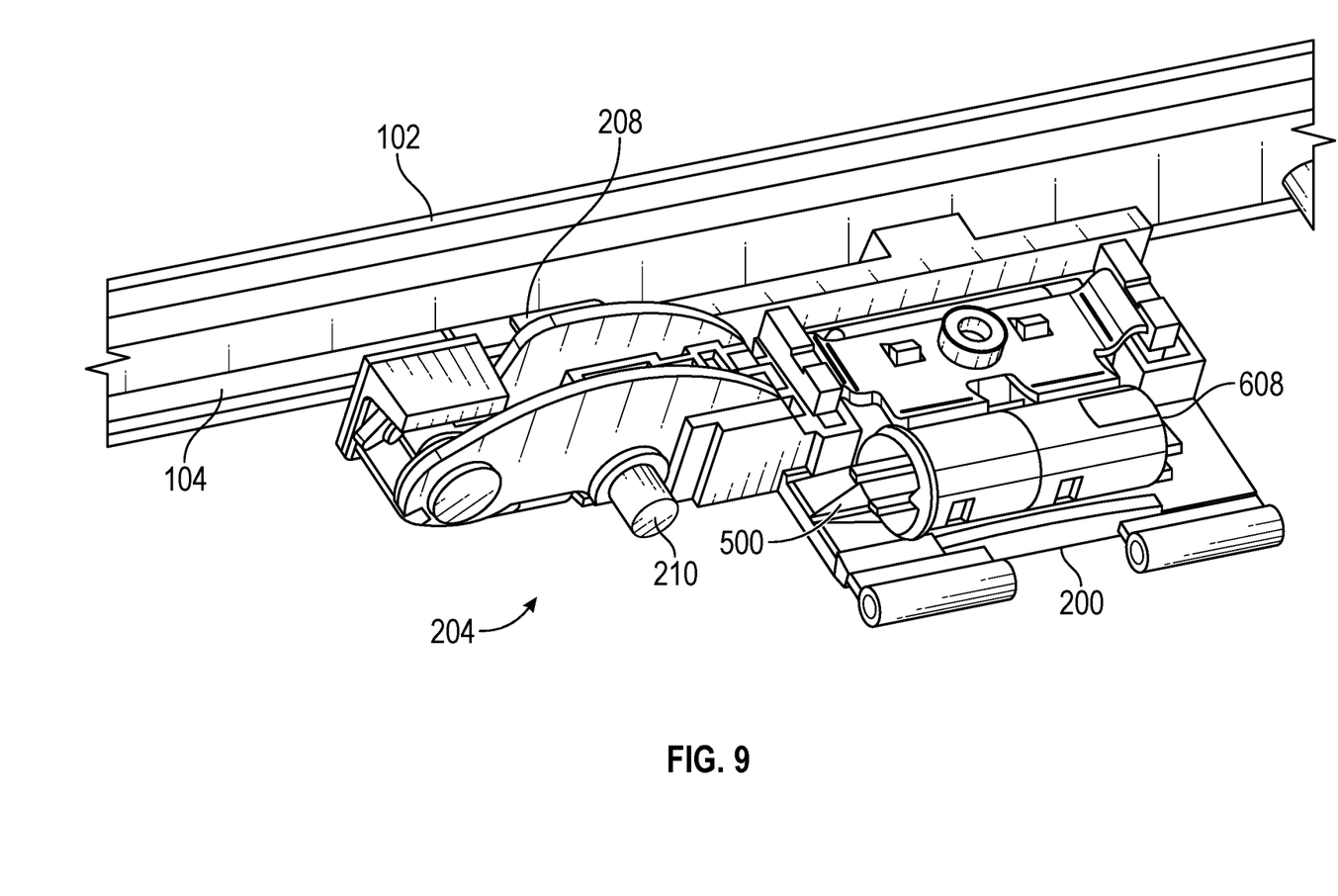
FIG. 9 is a perspective view of the pivot link, drive shoe and receptacle.

FIG. 9 is a perspective view of the pivot link, drive shoe and receptacle. The drive shoe 200 is configured to move parallel to the guide block 102 in a direction toward the lift guide 300. A receptacle 608 of the check assembly 308 is mounted to the drive shoe 200 and is configured to receive a pin of the check assembly 308 (see 701 in FIG. 11) by way of an opening at a forward face of the receptacle 608. The pin 701 being coupled to the lift guide 300. The receptacle 608 may be placed on the drive shoe 200 to position the opening of the receptacle in a vertical position and a horizontal position. The check assembly 308 may include a guide ramp 500 that is coupled to and/or formed in the drive shoe 200 and positioned proximate to a front opening of the receptacle 608. The guide ramp 500 defines an angled and/or curved indented surface configured to engage a portion of a locking component (for example, a collar) positioned over the pin 701. The guide ramp 500 is configured to urge the locking component by rotating the locking component as it approaches and enters a front of the receptacle 308 into an orientation in which the locking component is properly aligned with the receptacle 608. The drive shoe 200 includes a rigid body that is set rearward of the pivot link 204 to support the pivot link 204 and the receptacle 608 as the drive shoe 200 is guided by the rail 202.

The pivot link 204 may have two opposing plates that may include a first pivot pin 208 and a second pivot pin 210 protruding from opposite sides of the pivot link 204. The first pivot pin 208 is configured to slide along a first guide channel 104 formed in the relatively long guide block 102. The second pivot pin 210 slides in a mechanical lock of the check assembly 308, and will be described next.

Previous check systems for vehicle sunroofs include a rotatable lock that is configured to prevent undesired movement of a lift guide. This rotatable lock has been found to be prone to rotating and unlocking, for example, due to vibrations, while the check system is disengaged.

Figure 10:
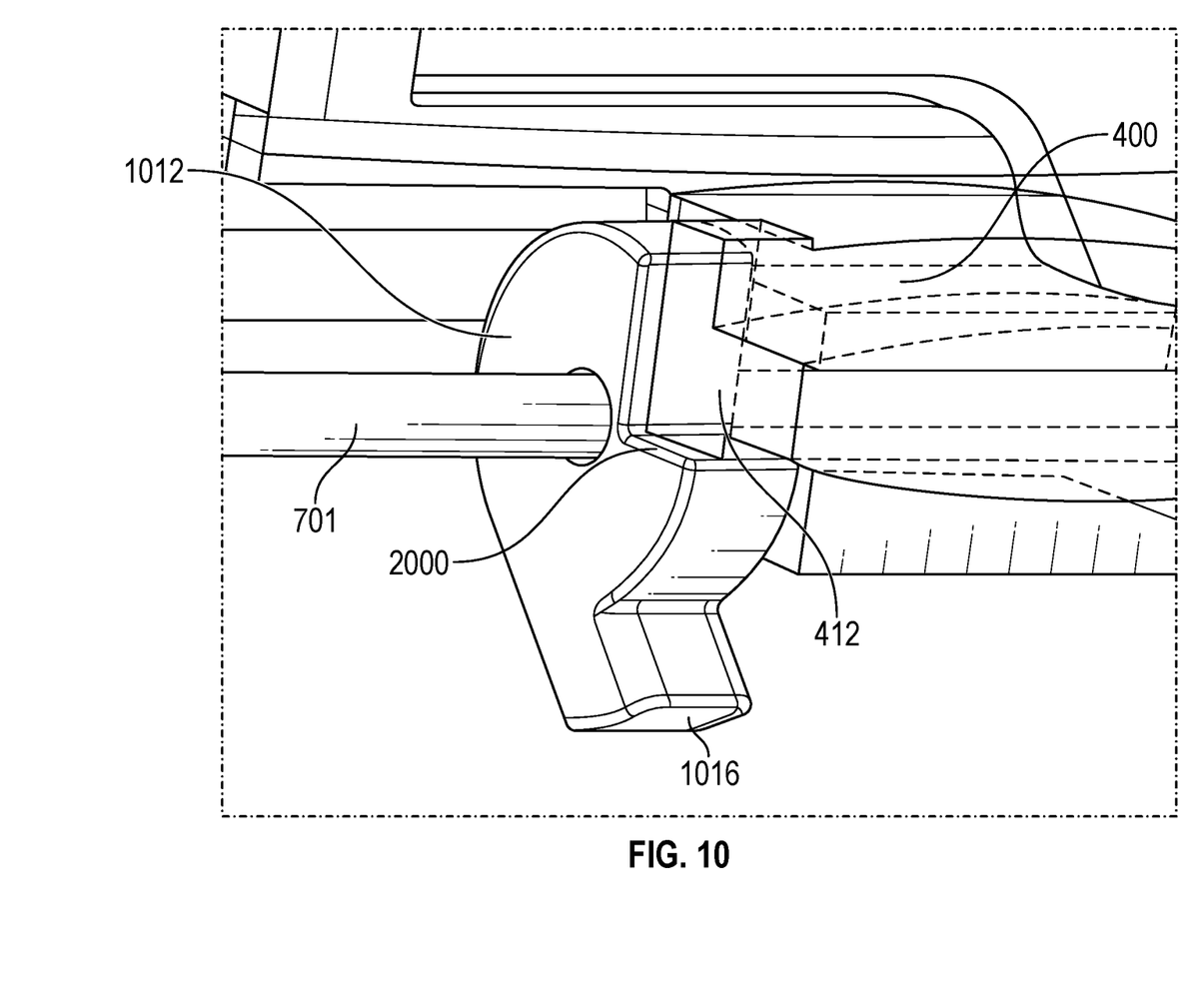
FIG. 10 is a perspective view of a rotating lock for a check assembly.

FIG. 10 is a perspective view of a rotating lock for a check assembly. In some embodiments, to prevent the lift guide 300 and mechanical lock 400 from sliding when the check assembly 308 is disengaged, the check assembly 308 includes a rotatable lock 1012 interposed between the lift guide 300 and the mechanical lock 400. The rotatable lock 1012 is positioned along and rotates around the pin 701 that extends through the mechanical lock 400 and the lift guide 300. The rotatable lock 1012 includes a protrusion 1016 extending away therefrom that engages a lock guide 1011. To prevent the rotatable lock from undesired rotation due to vibrations of the vehicle, the rotatable lock 1012 includes a notch 2000 positioned thereon and configured to catch an end portion 412 of the mechanical lock 400. The rotatable lock 1012 may have a hole which the pin 701 passes through. The rotatable lock 1012 may be in the form of a round puck having a notch of approximately 45 degrees, or within a range that enables the notch to hold the end portion 412 of the mechanical lock 400. The protrusion 1016 may be a stub extending from the circular edge of the puck shaped rotatable lock 1012. The protrusion 1016 is long enough to extend as far as necessary to into a guide channel of the lock guide 1011.

The lock guide 1011 includes a guide channel that engages with the protrusion 1016 when the lift guide 300 and the drive shoe 200 move cooperatively in the rearward direction. The lock guide 1011 then guides the protrusion 1016 to transition from facing downward to a horizontal direction, which urges the rotatable lock 1012 to rotate into a channel of the rail 202, in an unlocked position. When the lift guide 300 and the drive shoe 200 move in the forward direction, the guide channel of the lock guide 1011 rotates the protrusion 1016 back to facing the downward direction, which rotates the rotatable lock 1012 to rotate into a locked position. When the protrusion 1016 is facing downward and the rotatable lock 1012 is in the locked position, the end portion 412 of the mechanical lock 400 is allowed to reenter the notch 2000, thereby preventing the rotatable lock 1012 from rotating out of locked position.

When the end portion 412 of the mechanical lock 400 becomes caught by the notch 2000, the rotatable lock 1012 is prevented from rotating around the pin 701. Also, when the end portion 412 is caught by the notch 2000, the protrusion 1016 is maintained in a downward direction (i.e., a locked position), thereby preventing the lift guide 300 and the mechanical lock 400 from sliding.

Figure 11:
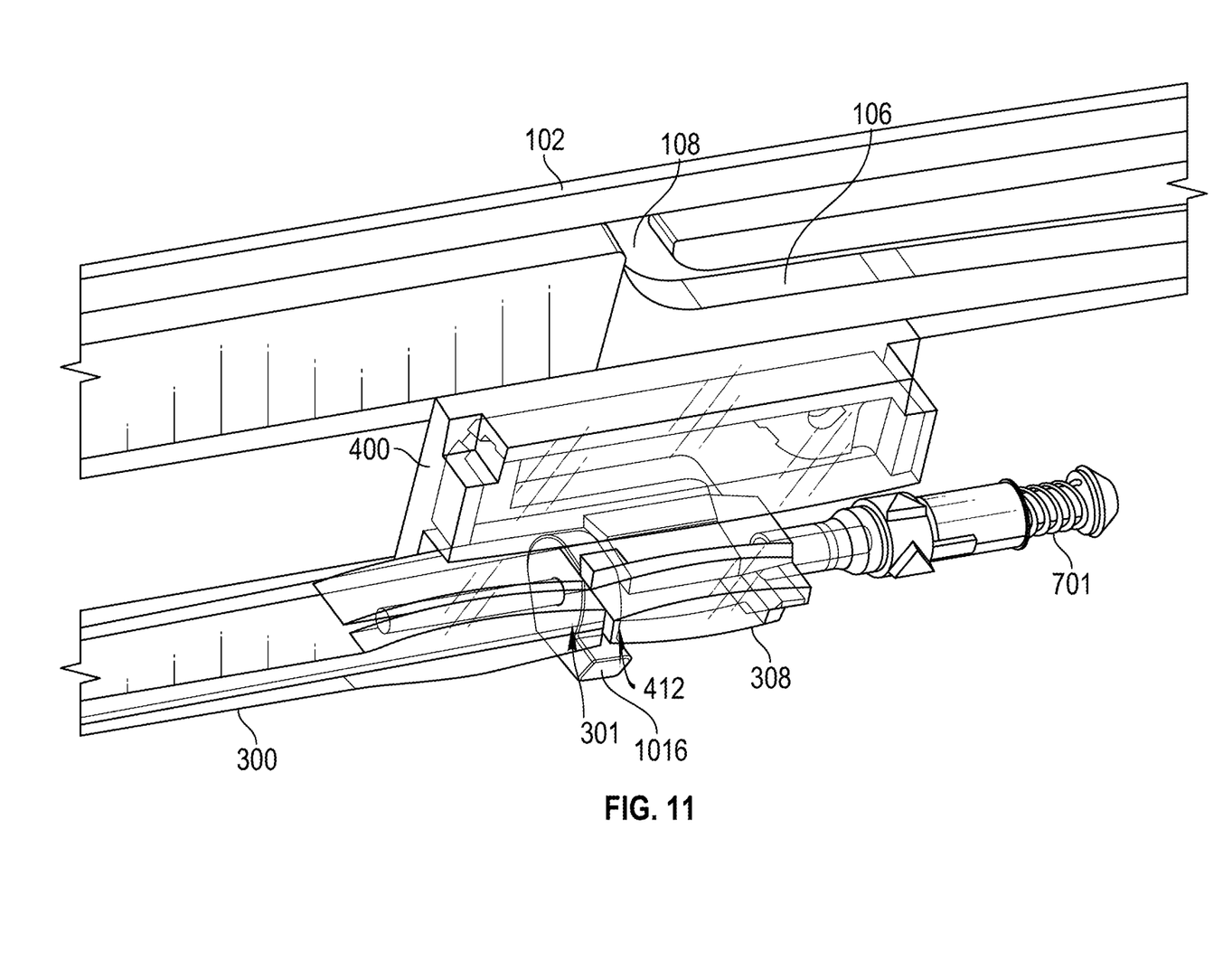
FIG. 11 is a perspective view of a check assembly and lift guide.

Regarding FIG. 11, prior to engagement of the check assembly 308, when the drive shoe 200 has not yet reached the mechanical lock 400 (e.g., as in FIG. 6), an end 301 of the lift guide 300 begins to engage or is proximate to the end portion 412 of the mechanical lock 400 and a side of the rotatable lock 1012. During this period, the protrusion 1016 is maintained in the downward direction, and the rotatable lock 1012 cannot rotate about the pin 701 from the locked position to an unlocked position.

Figure 12:
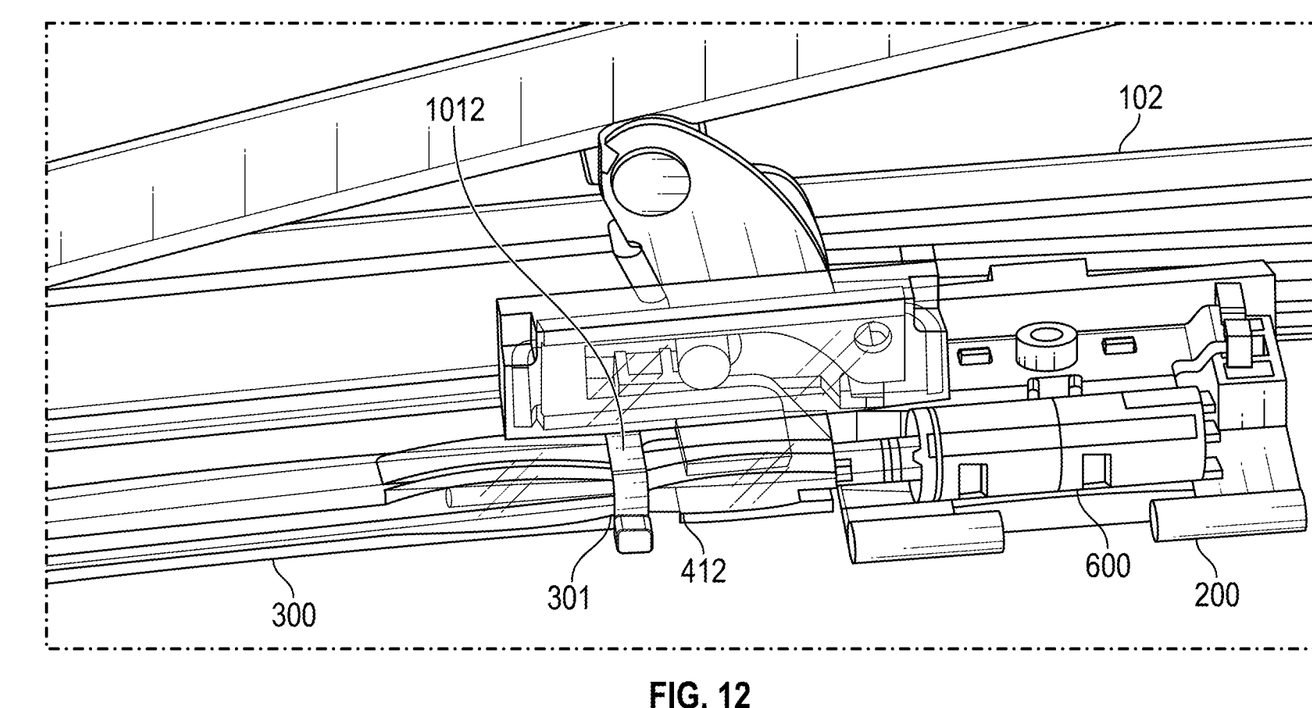
FIG. 12 is a perspective view of a drive shoe and lift gate coupled together via the check assembly.

As shown in FIG. 12, immediately after the check or locking assembly 308 engages, the drive shoe 200 and the mechanical lock 400 begin to cooperatively move in a rearward direction away from the lift guide 300. In particular, the lift guide 300 and the mechanical lock 400 are slidably coupled together via the pin 701 and configured to slightly separate from each other to provide a relatively small gap between the respective end portions 301, 412 of the lift guide 300 and the mechanical lock 400. In one embodiment the gap 4000 may be about 5 mm or at least slightly larger than a width of the lock 1012. That is, the end portion 412 of the mechanical lock 400 moves out of the notch 2000. As a result, with the check assembly 308 engaged the lift guide 300 is then able to move in the rearward direction cooperatively with the drive shoe 200 and the mechanical lock 400.

As the drive shoe 200, the lift guide 300, and the mechanical lock 400 move together in the rearward direction, a portion of the lock guide 1011 engaged with the protrusion 1016 urges the rotatable lock 1012 to rotate into a channel of the rail 202 such that the protrusion 1016 transitions from facing the downward direction to a horizontal direction (i.e., the unlocked position).

When the drive shoe 200, the lift guide 300, and the mechanical lock 400 move in a forward direction to return to their respective initial positions, the portion of the lock guide 1011 urges the rotatable lock 1012 to rotate such that the protrusion 1016 returns to facing the downward direction, which allows the end portion 412 of the mechanical lock 400 to reenter the notch 2000. Thus, when the end portion 412 of the mechanical lock 400 is positioned in the notch 2000, the lift guide 300 and the mechanical lock 400 are not able to substantially slide along the rail 202.

Further, when the end portion 412 of the mechanical lock 400 is not positioned in the notch 2000, the lift guide 300 and the mechanical lock 400 are able to slide.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A tilt and slide apparatus for a sunroof of a vehicle, comprising:
   a movable panel configured to open and close an opening formed at a roof of the vehicle;
   a rail provided at each edge portion in the opening in a vehicle width direction and being extended in a forward-rearward direction of the vehicle;
   a drive shoe configured to slide in each of a forward and a rearward direction of the vehicle;
   a pivot link pivotally coupled to the drive shoe, the pivot link configured to control tilting of the movable panel as the drive shoe slides in the forward direction;
   a lift guide connected to an end of the movable panel for facilitating sliding of the movable panel in the rearward direction; and
   a check assembly for engaging and disengaging the lift guide and the drive shoe, the check assembly including
     a locking pin mounted to and extending from the lift guide;
     a mechanical lock slidably mounted to the lift guide via the locking pin, the mechanical lock including an end portion;
     a rotatable lock mounted to and rotatable about the locking pin, the rotatable lock including a notch configured to engage the end portion of the mechanical lock and when the end portion engages the notch, the rotatable lock is prevented from rotating about the locking pin.

2. The tilt and slide apparatus of claim 1, wherein the rotatable lock further includes a protrusion extended from an outer periphery of the rotatable lock and configured to engage a lock guide in the locked position.

3. The tilt and slide apparatus of claim 2, wherein when the protrusion is facing downward direction, the notch is oriented so that the end portion of the mechanical lock enters the notch as the drive shoe moves in the forward direction.

4. The tilt and slide apparatus of claim 1, wherein the check assembly further includes a locking component, and
wherein the check assembly is configured to align a portion of the locking component in order to couple the drive shoe and the lift guide.

5. The tilt and slide apparatus of claim 4, wherein the check assembly further includes a receptacle mounted to the drive shoe, and
wherein the check assembly is configured to urge the locking component into alignment with the receptacle.

6. The tilt and slide apparatus of claim 5, wherein the check assembly is configured to urge the locking component by rotating the locking component as it approaches and enters a front of the receptacle into an orientation in which the locking component is properly aligned with the receptacle.

7. The tilt and slide apparatus of claim 1, wherein the check assembly is configured to maintain the drive shoe and the lift guide in a coupled state while the pivot link is locked in the raised position in order to facilitate sliding of the movable panel in the rearward direction opposite the forward direction.

8. The tilt and slide apparatus of claim 1, wherein the check assembly is configured to decouple the drive shoe from the lift guide.

9. A method for a tilt and slide apparatus for a sunroof of a vehicle, the tilt and slide apparatus including a movable panel configured to open and close an opening formed at a roof of the vehicle, a rail provided at each edge portion in the opening in a vehicle width direction and being extended in a forward-rearward direction of the vehicle, a drive shoe configured to slide in each of a forward and a rearward direction of the vehicle, a pivot link pivotally coupled to the drive shoe, the pivot link configured to control tilting of the movable panel, a lift guide connected to an end of the movable panel for facilitating sliding of the movable panel, and a check assembly for engaging and disengaging the lift guide and the drive shoe, the check assembly including a locking pin mounted to and extending from the lift guide, a mechanical lock slidably mounted to the lift guide via the locking pin, the mechanical lock including an end portion, and a rotatable lock mounted to and rotatable about the locking pin, the rotatable lock including a notch configured to engage the end portion of the mechanical lock, the method comprising:
while the check assembly is disengaged, engaging by the end portion of the mechanical lock the notch in the rotatable lock to prevent the rotatable lock from rotating;
when the drive shoe moves in the forward direction to the lift guide, pivoting the pivot link to a raised position to tilt the movable panel;
coupling the drive shoe and the lift guide via the check assembly;
locking the pivot link in the raised position;
cooperatively moving the drive shoe and the mechanical lock in the rearward direction away from the lift guide;
while the mechanical lock is separating from the lift guide to provide a gap between an end of the lift guide and end surface of the mechanical lock, the end portion of the mechanical lock moves out of the notch.

10. The method of claim 9, wherein the rotatable lock further includes a protrusion extended from an outer periphery of the rotatable lock, the method further comprising:
when the mechanical lock is engaged with the notch, the protrusion is in a vertical orientation facing a downward direction.

11. The method of claim 10, further comprising:
when the protrusion is in the vertical orientation and the end portion of the mechanical lock enters the notch the rotatable lock is prevented from rotating.

12. The method of claim 9, wherein the check assembly further includes a receptacle mounted to the drive shoe,
wherein the coupling by the check assembly includes aligning a portion of a locking component in order to couple the drive shoe and the lift guide by urging the locking component into alignment with the receptacle.

13. The method of claim 12, further comprising:
urging by the check assembly the locking component by rotating the locking component as it approaches and enters a front of the receptacle into an orientation in which the locking component is aligned with the receptacle.

14. The method of claim 9, further comprising:
maintaining the drive shoe and the lift guide in a coupled state while the pivot link is locked in the raised position while sliding the movable panel in the rearward direction.

15. The method of claim 9, further comprising:
decoupling the drive shoe from the lift guide.

* * * * *